(12) United States Patent
Nordström et al.

(10) Patent No.: US 9,119,093 B2
(45) Date of Patent: Aug. 25, 2015

(54) SCHEDULING OF DELAY-SENSITIVE TRAFFIC

(75) Inventors: Björn Nordström, Stockholm (SE); Eddie Corbett, Vallentuna (SE); Ying Sun, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/114,000

(22) PCT Filed: Apr. 29, 2011

(86) PCT No.: PCT/SE2011/050529
§ 371 (c)(1),
(2), (4) Date: Oct. 25, 2013

(87) PCT Pub. No.: WO2012/148331
PCT Pub. Date: Nov. 1, 2012

(65) Prior Publication Data
US 2014/0050090 A1 Feb. 20, 2014

(51) Int. Cl.
*H04W 28/02* (2009.01)
*H04W 72/12* (2009.01)
*H04W 72/10* (2009.01)
*H04W 72/14* (2009.01)

(52) U.S. Cl.
CPC ...... *H04W 28/0236* (2013.01); *H04W 72/1247* (2013.01); *H04W 72/1268* (2013.01); *H04W 72/10* (2013.01); *H04W 72/14* (2013.01)

(58) Field of Classification Search
CPC ............... H04W 28/0236; H04W 72/1268; H04W 72/1247; H04W 72/10; H04W 72/14
USPC ............................................... 370/232
See application file for complete search history.

(56) References Cited

U.S. PATENT DOCUMENTS

2005/0259662 A1* 11/2005 Kim et al. ................ 370/395.4
2006/0203765 A1* 9/2006 Laroia et al. ................ 370/328

(Continued)

FOREIGN PATENT DOCUMENTS

| EP | 2166803 A1 | 3/2010 |
|---|---|---|
| WO | 2008137959 A2 | 11/2008 |
| WO | 2011019903 A1 | 2/2011 |

OTHER PUBLICATIONS

Unknown Author. "LTE; Evolved Universal Terrestrial Radio Access (E-UTRA) and Evolved Universal Terrestrial Radio Access Network (E-UTRAN); Overall description; Stage 2." ETSI TS 136 300 V 10.3.0. Apr. 2011.

*Primary Examiner* — Mohammad Anwar
(74) *Attorney, Agent, or Firm* — Murphy, Bilak & Homiller, PLLC

(57) ABSTRACT

The invention concerns a method, uplink traffic control device and computer program product for reducing the delay of uplink communication between a mobile station and a wireless communication network. The uplink traffic control device (21) comprises an uplink scheme determining unit (24) configured to obtain a service type indicator associated with a mobile station and determine an uplink transmission scheme based on the obtained service type indicator and a transmission control unit (30) configured to periodically grant transmissions to be made from the mobile station according to the uplink transmission scheme in order to speed up mobile station transmissions to the wireless communication network.

14 Claims, 4 Drawing Sheets

(56) References Cited

U.S. PATENT DOCUMENTS

| | | | |
|---|---|---|---|
| 2007/0121542 A1* | 5/2007 | Lohr et al. | 370/329 |
| 2007/0183353 A1* | 8/2007 | Malladi | 370/312 |
| 2008/0214197 A1* | 9/2008 | Englund et al. | 455/450 |
| 2009/0137254 A1 | 5/2009 | Vukovic et al. | |
| 2010/0135229 A1* | 6/2010 | Lohr et al. | 370/329 |

\* cited by examiner

SCHEDULING OF DELAY-SENSITIVE TRAFFIC

TECHNICAL FIELD

The invention relates to delay in wireless communication networks. More particularly, the invention relates to a method, uplink traffic control device and computer program product for reducing the delay of uplink communication between a mobile station and a wireless communication network.

BACKGROUND

Wireless communication networks evolve towards higher data rates, together with improved capacity and coverage. This places new demands on these wireless communication networks.

In the 3rd Generation Partnership Project (3GPP) standardization body technologies like Global System for Mobile Communication (GSM), High-Speed Packet Access (HSPA) and Long Term Evolution (LTE) have been and are currently developed.

LTE is the latest technology standardised. It uses an access technology based on OFDM (Orthogonal Frequency Division Multiplexing) for the downlink (DL) and Single Carrier FDMA (SC-FDMA) for the uplink (UL). The resource allocation to mobile stations, in LTE denoted user equipment (UE), on both DL and UL is performed adaptively by the concept of fast scheduling, taking into account the instantaneous traffic pattern and radio propagation characteristics of each mobile station. Assigning resources in both DL and UL is performed in a so-called scheduler situated in a base station, in LTE often denoted eNodeB.

With the higher speeds a number of various applications that a user of the mobile station can be engaged in have evolved. It is for instance of interest for a user to involve him- or herself in online games, where small amounts of uplink data are transferred fairly often from the mobile station to another device involved in a game. Here the transferred data may be gaming commands and the other device may be another mobile station or another type of user terminal like a PC or even a server. Gaming is one example of delay-sensitive traffic. The increase of this delay-sensitive traffic and its significant share in the internet traffic leads to the radio interfaces of wireless communication systems having to meet various latency requirements to ensure that a mobile station user can enjoy the activities employing this type of traffic. Another example of delay-sensitive traffic is ping. Ping is for instance used to estimate the delay of a channel as well as to measure the performance in radio systems in order to for instance compare and/or rank different systems.

Setting up of traffic in a wireless communication network is often referred as allocation of resources. When resources are allocated to a mobile station desiring to send data in the uplink, there are normally a number of activities that have to be performed. First the mobile station sends a scheduling request (SR). This is followed by the base station responding with a grant, which grant includes information on what time/frequency resources the mobile station shall use. The mobile station then transfers a Buffer Status Report (BSR) after which the base station issues a grant for further data. It is not until it receives this further grant that the mobile station can transmit the actual data it intends. This process is time consuming, especially if the mobile station is to run through the process each time it desires to transfer data.

The transfer of uplink data is thus time consuming and puts a limit to the user enjoyment of the application employing delay-sensitive traffic. There is therefore a need for speeding up uplink communication of delay-sensitive traffic in wireless communication systems.

Some activities have previously been performed in relation to the above-mentioned access grants. WO 2009/126078 does for instance describe a method for use in a cellular system, in which there are controlling nodes which schedule control messages from users in a cell to the controlling node by transmitting uplink grants to the users. A controlling node here transmits a downlink control message to a user, and estimates, based on the nature of the downlink control message, the size of an up link control message in a response from the user and a transmit time when the user will be ready to transmit the control message, and transmits an up link grant to the user, designed to fit the estimated size of the control message from the user and the estimated transmit time. It can thus be seen that this document describes influencing access grants in relation to control messages sent by a mobile station.

There is in view of what has been described above a need for lowering the delay of uplink communication.

SUMMARY

The invention is therefore directed towards reducing the delay of uplink communication between a mobile station and a wireless communication network.

One object of the invention is to schedule uplink traffic from a mobile station to a base station in a wireless communication network in a way that reduces the delay of the scheduled uplink data.

This object is according to a first aspect of the invention achieved through a method for scheduling uplink traffic from a mobile station to a base station in a wireless communication network. The method is performed in a node of the wireless communication network and comprises obtaining a service type indicator associated with the mobile station, determining an uplink transmission scheme based on the obtained service type indicator, and periodically granting transmissions to be made from the mobile station according to the uplink transmission scheme in order to speed up mobile station transmissions to the wireless communication network.

This object is according to a second aspect of the invention achieved by an uplink traffic control device for scheduling uplink traffic from a mobile station to a base station in a wireless communication network. The uplink traffic control device comprises:

an uplink scheme determining unit configured to obtain a service type indicator associated with the mobile station and determine an uplink transmission scheme based on the obtained service type indicator, and a transmission control unit configured to periodically grant transmissions to be made from the mobile station according to the uplink transmission scheme in order to speed up mobile station transmissions to the wireless communication network.

This object is according to a third aspect of the invention also achieved through a computer program for scheduling uplink traffic from a mobile station to a base station in a wireless communication network. The computer program product comprises a computer readable storage medium comprising computer program code causing an uplink scheme determining module of an uplink traffic control device to:

obtain a service type indicator associated with the mobile station, determine an uplink transmission scheme based on the obtained service type indicator, and periodically grant transmissions to be made from the mobile station according to the uplink transmission scheme in order to speed up mobile station transmissions to the wireless communication network.

The invention according to these aspects has a number of advantages. It allows the mobile station to send data without having to request permission in advance, which considerably shortens the delay and will therefore enhance the user enjoyment if being involved in activities like on-line games.

According to one variation of the invention the uplink transmission scheme specifies the periodicity of the uplink transmission as well as the data size of the transmissions.

According to another variation of the invention, the method further comprises receiving data from the mobile station, where at least some of the received data is received as a response to a granting of transmission. The method may further comprise updating the scheme based on received data.

According to the same variation of the invention the uplink traffic control device is also configured to receive data from the mobile station, where at least some of the received data is received as a response to a granting of transmission. In this case the uplink scheme determining unit may be further configured to update the scheme based on received data.

In another variation of the invention, the method further comprises estimating the data transmission requirements of the mobile station and the determining of the scheme is also based on the estimated data transmission requirements.

In the same variation of the invention the uplink traffic control device further comprises a transmission requirement estimating unit configured to estimate the data transmission requirements of the mobile station and the uplink scheme determining unit is further configured to determine the scheme also based on the estimated data transmission requirements.

In yet another variation of the invention, the method further comprises estimating the battery consumption of the mobile station and the determining of the scheme is also based on the estimated battery consumption.

In the same variation of the invention the uplink traffic control device further comprises an energy consumption estimating unit configured to estimate the battery consumption of the mobile station and the uplink scheme determining unit is further configured to determine the scheme also based on the estimated battery consumption.

According to yet a further variation of the invention, the method comprises obtaining traffic load data concerning the traffic load in the wireless communication system and determining if the uplink transmission scheme is to be applied or not based on the traffic load data.

In the same variation of the invention the uplink traffic control device further comprises a scheme application control unit configured to obtain traffic load data concerning the traffic load in the wireless communication system and determine if the uplink transmission scheme is to be applied or not based on the traffic load data It is here possible that the uplink transmissions scheme is determined before mobile station transmissions are granted. The uplink scheme determining unit may thus be configured to determine the uplink transmissions scheme before mobile station transmissions are granted.

According to yet another variation of the invention the uplink traffic control device further comprises an input buffer, which the transmission control unit is configured to read, and the uplink scheme determining unit is configured to place data in the input buffer with a rate that causes the transmission control unit to grant mobile station transmissions according to the uplink transmission scheme.

According to the same variation of the invention the periodical granting of transmissions performed in the method is made based on artificial data being placed in an input buffer associated with a transmission control unit, which artificial data is placed in the buffer with a rate that causes the transmission control unit to grant mobile station transmissions according to the uplink transmission scheme.

According to a further variation of the invention the uplink scheme determining unit is configured to determine the uplink transmission scheme based also on statistical data about the mobile station.

According to this variation, the determining of an uplink transmission scheme in the method is based also on statistical data about the mobile station.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
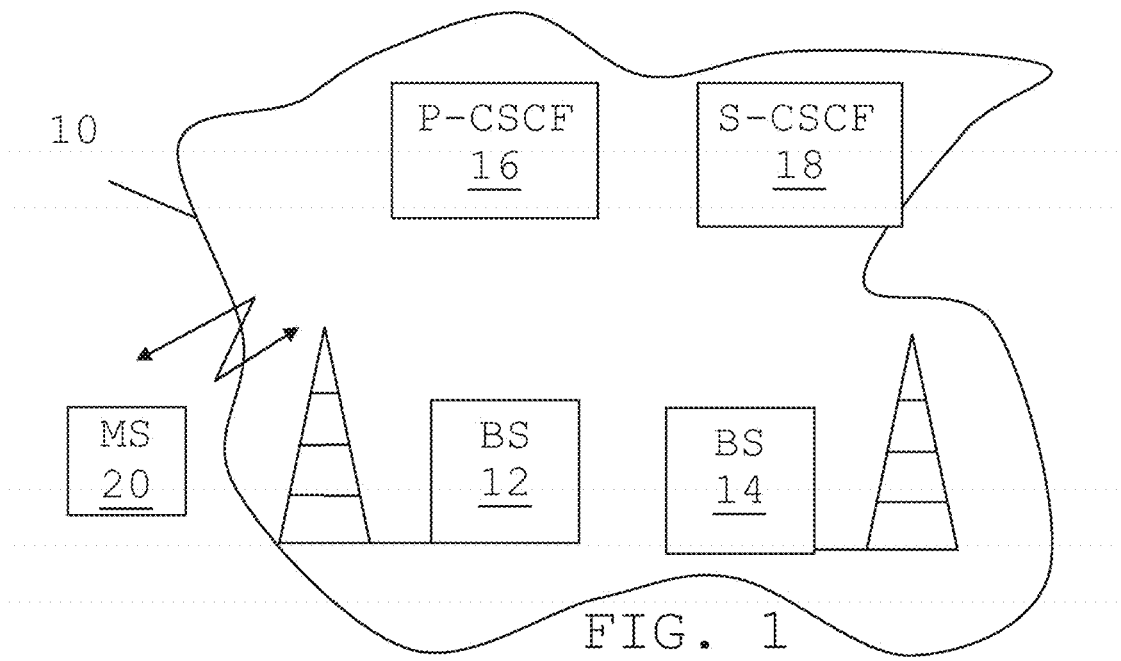
FIG. 1 schematically shows a user terminal communicating with a first base station in a wireless communication network, where the network also comprises a second base station and two further nodes

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards reducing the delay experienced by a mobile station when involved in delay-sensitive activities such as on-line gaming or ping.

The invention will now be described in more detail in the non-limiting example context of a wireless communication network 10 shown in FIG. 1. The wireless communication network 10 may here be a cellular network such as a Universal Mobile Telecommunications System (UMTS) network or a Long Term Evolution (LTE) network. These are merely some examples of some types of networks in which the invention may be implemented. Several other types of networks exist.

To the network 10 there is connected a mobile station 10 being associated with a user. Here the mobile station may be a phone, such as mobile phone or a computer like a lap top computer or a palm top computer. These are just a few examples of mobile stations that can be used together with the invention. A mobile station is in LTE often denoted User Equipment (UE).

The mobile station 20 is more particularly communicating with a first base station BS 12. The first base station 12 is here one network node. The system also includes a number of other network nodes, where as an example a second base station BS 14 is shown as well as two more central nodes, a Proxy Call Session Control Function P-CSCF server 16 and a Serving Call Session Control Function S-CSCF 18. These latter nodes are nodes at a higher hierarchical level of the system than the base stations. For this reason the base stations 12 and 14 are often described as being provided in an access network of the wireless communication network, while the servers 16 and 18 are described as provided in a core network of the wireless communication network.

Figure 2:
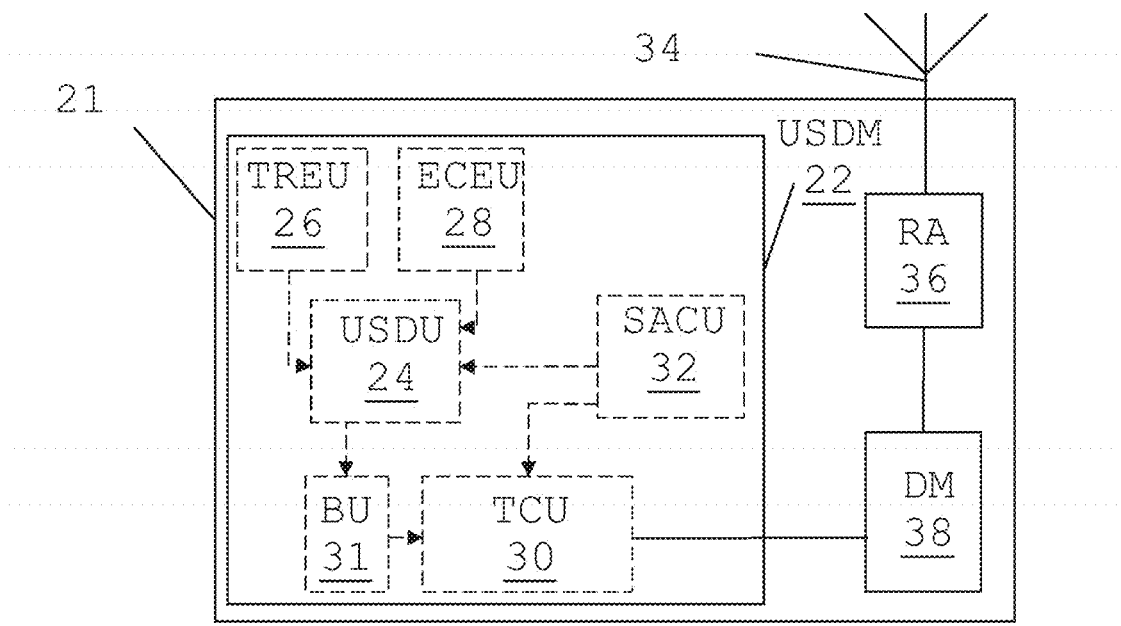
FIG. 2 shows a simplified block schematic of an uplink traffic control device according to the invention.

FIG. 2 shows a block schematic of an uplink traffic control device 21 according to the invention. In one variation of the invention this traffic control device 21 is the first base station. However, it should be realized that it may as an alternative be provided as another network node. If for instance the wireless communication network is an UMTS network, then the device can be provided as a radio network controller (RNC). As yet another alternative, it is possible that the device 21 is provided in a node on a higher hierarchical level, such as in a server in the core network, for instance the S-CSCF 18.

The uplink traffic control device 21 does in this example comprise at least one antenna and here only one 34 is shown, which antenna is connected to a radio circuit RA 36. A data modulator DM 38 is in turn connected to the radio circuit 36. According to the invention, the base station also comprises an uplink scheme determining module USDM 22. The uplink scheme determining module 22 in turn comprises a number of units. It comprises a transmission control unit TCU 30, which is connected to the data modulator 30. The transmission control unit TCU 30 is connected to a scheme application control unit SACU 32 and to an input buffer 31, which buffer 31 is also connected to an uplink scheme determining unit USDU 24. The uplink scheme determining unit 24 is in turn connected to a transmission requirement estimating unit TREU 26, to an energy consumption estimating unit ECEU 28 and to the scheme application control unit 32. The transmission control unit is in this example a so-called scheduler, which is responsible for scheduling uplink data in the time and/or frequency domain for a number of mobile stations being connected to the communication network via the uplink traffic control device.

The invention is, as was mentioned earlier concerned with the problem of reducing the delay of uplink communication in relation to delay sensitive traffic such as ping and on-line games.

Figure 3:
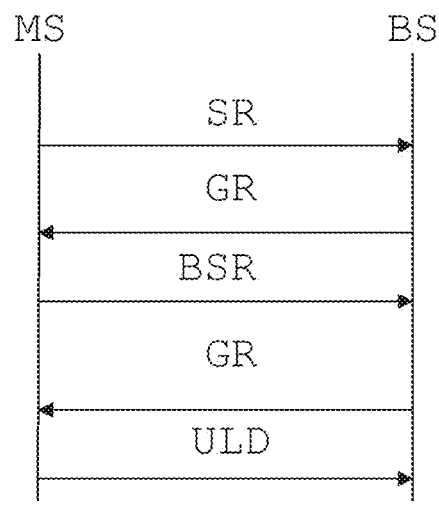
FIG. 3 shows the signals transmitted between a mobile station and a base station when transmitting uplink data in a conventional way, FIG. 4 schematically shows scheduling requests sent by the mobile station to the first base station together with grants sent as responses as well as additional grants according to the invention.

The problem that is at hand will now briefly be described with reference being made to FIGS. 3 and 4, where FIG. 3 shows a number of signals exchanged between the mobile station and a base station when a mobile station such as the mobile station 20 in FIG. 1 is to transmit uplink data to the wireless communication system 10.

The mobile station 20 is typically equipped with an uplink buffer and when there is data in this buffer needed to be transmitted, the mobile station transmits a scheduling request SR to the wireless communication network 10 and more particularly to the first base station 12. Such a scheduling request is in LTE typically transmitted on a dedicated SR channel (D-SR) or on a contention based Random Access Channel (RA-SR). A D-SR requires that the mobile station is synchronized in the uplink (UL) and that the mobile station has been assigned an SR channel on the Physical Uplink Control Channel (PUCCH).

Both of these procedures results in a delay. The scheduling request SR is read by the base station 12 and it then responds with an UL grant GR. The grant typically includes information on what time/frequency resources the mobile station shall use. With support from a so-called link adaptation function also a transport block size, modulation, coding and antenna scheme is selected. This means that link adaptation is performed in the base station and the selected transport format is signaled together with information of the user ID to the mobile station. The mobile station then decodes the grant information and transmits a Buffer Status Report BSR as a response. This report includes information of the amount of data desired to be transmitted, i.e. the size of the data in the uplink buffer. As the base station 12 receives the Buffer Status Report BSR it then issues a grant GR of further data based on the Buffer Status Report. The mobile station 20 can then transmit the uplink data ULD after having received this latest grant.

In this process there are a number of delays. The transmission scheduling request SR typically takes about of 5-15 ms depending on PUCCH SR configuration for the mobile station 20. The issuing of the first grant typically takes 2 ms. The decoding of this grant in the mobile station then takes about 4 ms and the transmission of a BSR and the issuing of the further grant takes another 3-4 ms. The decoding of the further grant in the UE takes about 4 ms and the transmission of uplink data another ms. Finally the decoding of the uplink data transmission ULD typically takes about 3-4 ms. This means that the total time between when data is available for transmission at the mobile station until the same data is available at the base station 12, which in the example given above may approximately be: (5-15 ms)+2 ms+4 ms+1 ms+(3-4 ms)+4 ms+1 ms+(3-4 ms)=23-35 ms.

The conclusion is that the time for delivering the delay sensitive traffic is long and involves a substantial amount of radio signaling.

Furthermore, the example given above was made in relation to the case when the mobile station has a dedicated SR resource to transmit a D-SR. In case it does not and has to transmit an RA-SR, the delay is prolonged even more.

This delay problem is according to the invention solved by proactively scheduling a mobile station without actual knowledge of the mobile station buffer content.

The data transmission requirements of the mobile station are then estimated. It is here possible to monitor the behaviour of the mobile station and use obtained statistics to control the amount of data and the periodicity of the data that the base station is to receive from the mobile station.

Figure 4:
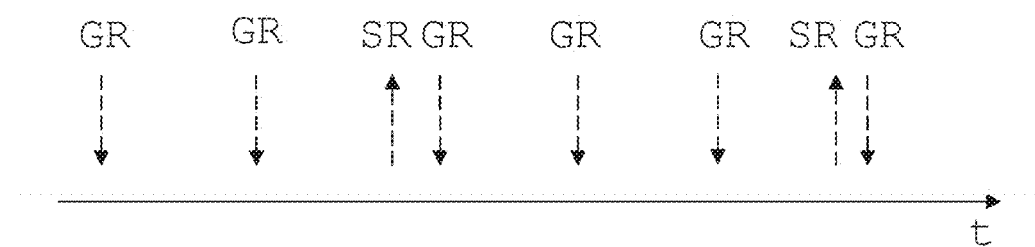

FIG. 4 schematically shows how a mobile station sends scheduling requests regularly and also how grants are provided as responses to such scheduling requests. These scheduling requests SR may as an example be repeated every 10-20 ms. It should be realized that in relation to a scheduling request SR all the signals shown in FIG. 3 are in fact being sent. However, only one grant GR is shown in order to simplify the figure.

There is thus considerable delay in case the mobile station 20 and base station 12 are to go through all the above-mentioned steps each time the mobile station 20 is about to send data. In order to simplify the situation and lower the delay, the present invention proposes that the uplink traffic control device ensures that grants are sent regularly. This means that the invention proposes that the uplink traffic control device 21, which in a first variation of the invention is the above described first base station 12, ensures that grants are sent without in fact knowing that the mobile station has data in its output buffer intended for the wireless communication system 10.

Figure 5:
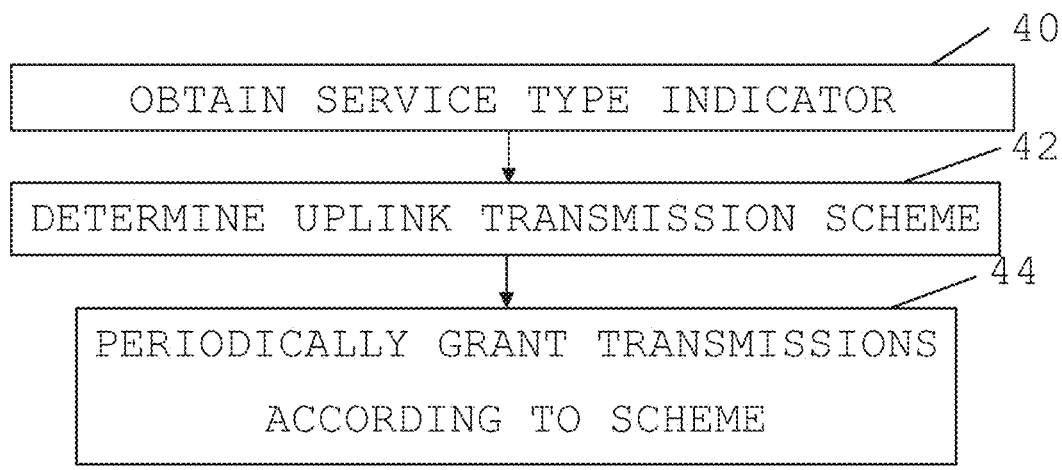
FIG. 5 shows a flow chart of a number of method steps in a general method for scheduling uplink traffic according to a first embodiment of the invention, FIG. 6 schematically shows a flow chart of a number of method steps in a method for scheduling uplink traffic according to a second more detailed embodiment of the invention, and FIG. 7 schematically shows a computer program product according to an embodiment of the invention in the form of a CD ROM disc with a computer program performing the functionality of the invention.

How this can be done according to a first embodiment of the invention will now be described with reference being made to FIGS. 1, 2 and 5, which latter figure shows a flow chart of a number of number of method steps in a general method for scheduling uplink traffic according to a first embodiment of the invention.

The method, which is performed in the network node comprising the uplink traffic control device 21, starts with the uplink scheme determining unit 24 obtaining a service type indicator associated with or concerning the mobile station 20, step 40. The indicator thus identifies the mobile station 20 that desires to transmit uplink data. Such an indicator may be a Quality of Service parameter like the parameter Quality Class Indicator (QCI) used in LTE. It is an indicator that identifies the type data traffic that the mobile station wants to send in the uplink. This indicator may be obtained by the uplink scheme determining unit 24 from the mobile station 20. As an alternative it is possible that it is obtained from another network node, for instance from a server in the core network, such as the S-CSCF 18 or P-CSCF 16. This indicator also provides a priority setting of the communication of the mobile station in relation to a communication session in which the mobile station or rather the user of the mobile station wishes to engage, which session would then involve delay sensitive traffic such as communication in an on-line gaming session or a ping The priority is typically a low priority, where speech and video communication may have higher priorities. Based on this indicator the uplink scheme determining unit 24 then determines an uplink transmission scheme of the mobile station 20. This determination may involve estimating the size of data to be transmitted and the frequency with which the data is to be transmitted by the mobile station. This estimation may be performed through considering also other data such as what data sizes and how frequently data with these sizes have previously been used in earlier sessions involving delay-sensitive traffic. It is here also possible to consider the frequency with which scheduling requests and BSRs have been sent as well as earlier content of these in relation to earlier communication sessions of the same type. In this way an uplink transmission scheme specifies the periodicity of the uplink transmissions as well as the data size. The scheme is furthermore determined in advance of the actual uplink grants being given. The scheme is thus pre-determined before grants are being sent. Thus, the scheme may initially be provided before the mobile station sends a scheduling request.

Thereafter the uplink scheme determining unit 24 informs the transmission control unit 30 of the scheme, which transmission control unit 30 goes on and periodically grants transmissions to be made from the mobile station 20 according to the scheme, step 44. This may involve the transmission control unit 30 issuing grants GR to transmissions, which are being issued using the data modulator 38, radio circuit 36 and antenna 34. Here the uplink scheme determining unit may employ the buffer 31 for informing the transmission control unit 30. However, it should be realized that it is also possible with a direct command being issued. The use of the buffer will be described in more detail in relation to a second embodiment of the invention. The scheme may also make room for requested grants, i.e. for grants sent as a result of a received schedule request SR or BSR. If the grant for further data sent after receiving such a request from the mobile station coincides with a grant according to the scheme, the grant according to the scheme may be held back.

In this way it is possible to grant transmissions in addition to those for which the mobile station issues a scheduling request SR. As can for instance be seen in FIG. 4, the uplink traffic control device 21 issues several additional grants GR in addition to the grants GR issued after a scheduling requests SR. These additional grants speed up mobile station transmissions to the wireless communication network.

Figure 6:
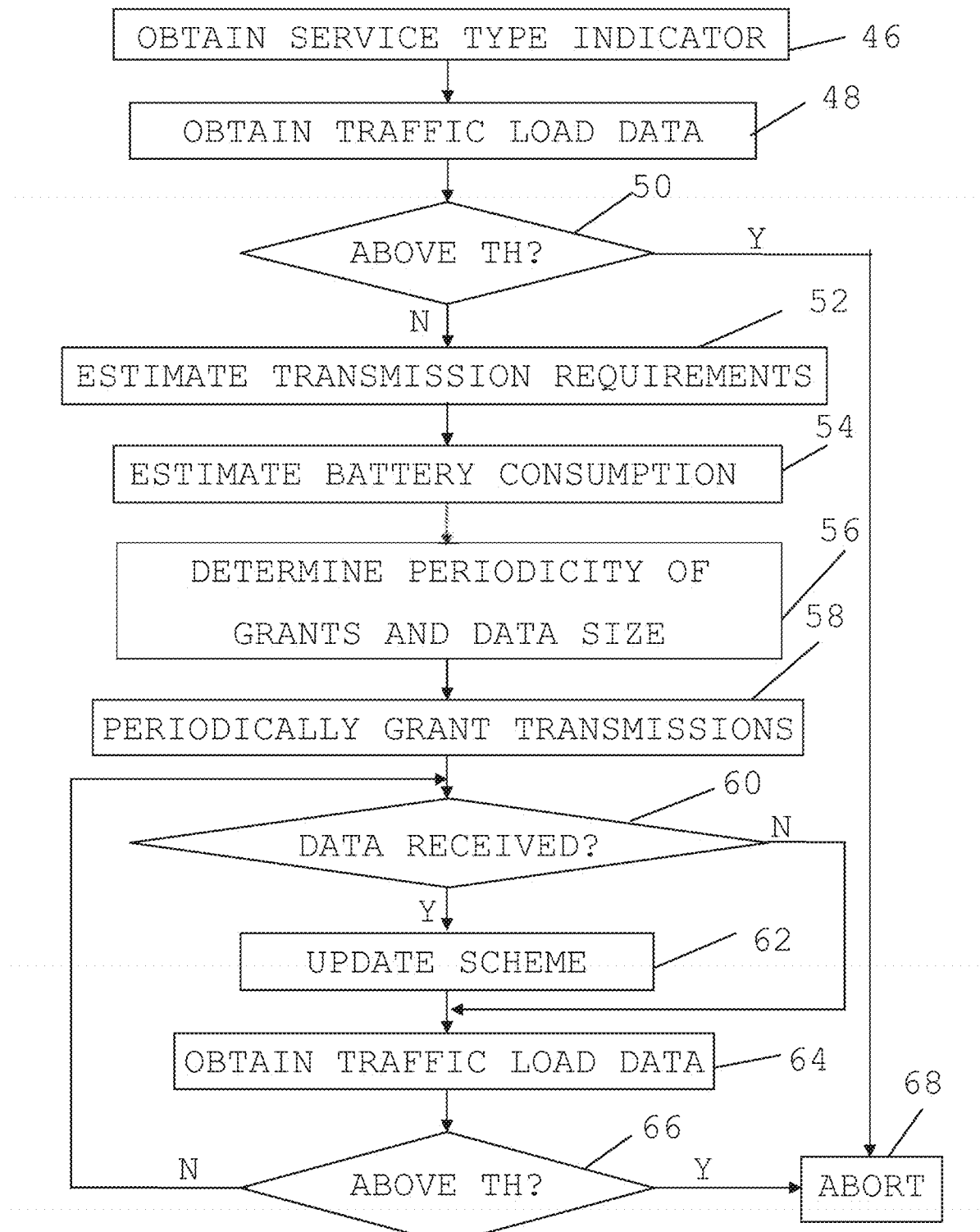

Now a second more specific embodiment of the invention will be described with reference being made to FIG. 6, which shows a flow chart of a number of method steps in a method for scheduling uplink traffic according to the second embodiment.

As in the first embodiment the method starts with the uplink scheme determining unit 24 obtaining a service type indicator, step 46, which indicator indicates the quality of service associated with the type of communication the mobile station 20 is to be engaged in in the desired communication session. From this indicator it is then possible to estimate the data transmission requirements of the mobile station 20.

As this is done, the scheme application control unit 32 at the same time obtains traffic load data concerning the traffic load in the wireless communication system, step 48. This data may be data received from a central node, such as the P-SCSC or the S-CSCF. Such data is then received via a transport network interface (not shown). It may also be local traffic load data received from the transmission control unit 30 based on the scheduling of other traffic, typically associated with other mobile stations. The traffic load data may here furthermore include data of traffic having a higher priority as well as pre-existing traffic of the same priority. The traffic control unit 30 will typically obtain such data in the course of resource allocation via the antenna 34 and radio communication unit 36. The traffic load obtained via the traffic load data is then compared, by the scheme application control unit, 32, with a corresponding traffic load threshold. If the traffic load is above the threshold, step 50, then the scheme application control unit 32 aborts the uplink scheduling, step 68, which may at this stage involve instructing the uplink scheme determining unit 24 to stop determining an uplink schedule. It may also involve instructing the transmission control unit 30 to disallow any scheduling of traffic from the uplink scheme determining unit 24. If however the traffic load is below the threshold, step 50, the uplink scheme determining unit 24 is allowed to continue.

After having obtained the indicator, the uplink scheme determining unit 24 instructs the transmission requirement estimating unit 26 to estimate transmission requirements and also instructs the energy consumption estimating unit 28 to estimate the battery consumption of the mobile station. The transmission requirement estimating unit 26 then estimates the transmission requirements of the mobile station 20, step 52. This is typically done through investigating the service type indicator, which defines the kind of service requested.

The indication therefore gives a hint about the requirements of the mobile station 20. The indicator may also provide an initialisation value of the amount of data required. The transmission requirement estimating unit 26 may also consider statistical data regarding the behaviour of the mobile station 20, such as periodicity and data amounts in previous sessions of the same and/or different types. It is here also possible to consider the fact if there is any downlink data intended for the mobile station in the session in question. At the same time the energy consumption estimating unit 28 estimates the battery consumption of the mobile station, step 54. This may be based on a model of the energy consumption, the estimated transmission requirements and an estimation of the length of the session. This session length estimation may consider the length of previous sessions of the same type. In the battery consumption estimation it is furthermore possible to also consider the statistical general behaviour of the mobile station, such as the frequency and length of other types of communication sessions. It may also consider downlink data intended for the mobile station 20.

These estimations are then sent to the uplink scheme determining unit 24, which goes on and determines the periodicity of grants and data size allowed at each grant, step 56. The determination is thus based on the estimated transmission requirements and the estimated battery consumption. Typically the periodicity and size may be determined as a trade off between the transmission requirements and battery consumption requirements. When the uplink scheme determining unit 24 has determined a scheme, it then informs the transmission control unit 30 of the scheme and therefore the transmission control unit 30 periodically schedules grants to the mobile station using the data modulator 38, radio circuit 36 and antenna 34.

The informing could be provided through sending a direct instruction to the transmission control unit 30. However, according to the second embodiment of the invention another method is used. Here the uplink scheme determining unit 24 provides an internal special queue of artificial data in the buffer 31 dedicated to the mobile station 20. This low-priority queue is provided for the delay-sensitive data associated with the mobile station 20. Since it is fed with artificial data, the low priority queue will match the delay-sensitive data. The rate at which this buffer 31 is filled, i.e. the rate with which data is placed, and the amount with which it is filled causes the transmission control unit to periodically transmit grants to the mobile station 20 according to the scheme.

The transmission control unit 30 may handle a number of ordinary transmission control queues for mobile stations, which queues have higher priority data to be transmitted, such as voice and video data, while the queue in the buffer 31 concerns low priority queue associated with the delay sensitive data of the mobile station 20. The uplink scheme determining unit 24 can therefore be considered to add one extra priority queue, which is set up with a lower priority than the normal queues.

As grants are caused to be transmitted in this way, the uplink scheme determining unit 24 investigates if there is new data received from the mobile station 20, such as SR, BSR or real uplink data send after receiving a grant, such as number of received bits. This means that at least some of the received data is received as a response to the granting of transmissions. If there is such data, step 60, it or information of it is provided to the transmission requirement estimating unit 26, which updates the transmission requirements. The update can here be based on the number of bits received. It is also possible consider if any downlink data is intended for the mobile station 20. The energy consumption estimating unit 28 may here also update the estimated battery consumption based on this data and the elapsed time. However it is also possible that the battery consumption is estimated based on other data either instead of or in addition to the received data. In one variation the update of the battery consumption may be made independently of the received data. The base station may for instance measure channel gain updates from other reference signals, such as the sounding reference signal (SRS) in LTE and use for updating the battery consumption estimation. Based on these updated estimations, and thus perhaps based on at least some of the received data, the scheme may thus be updated by the uplink scheme determining unit 24, step 62. If the scheme is updated, the transmission control unit 30 is then informed in a suitable way.

In both cases, both when there is new data that may or may not cause an update of the scheme or if there is no new data, the scheme application control unit 32 continues to obtain traffic load data, step 64, and compare the traffic load with a traffic load threshold, which traffic load data is then especially traffic load having a higher priority than the delay-sensitive data.

If the load is above the threshold, for instance if there is higher priority traffic above the threshold, then the scheme application control unit 32 may inform the transmissions control unit 30 to stop issuing grants according to the scheme. This may be done through a direct command. It may also be done indirectly through emptying the buffer 31 and stopping generation of artificial data and thus through removing the low-priority queue. The scheme application control unit 32 may also inform the uplink scheme determining unit 24 to stop updating the scheme. However, this is not necessarily the case, since it is possible that the additional granting according to the scheme will be resumed if the traffic load again permits it.

In this way it is possible to allow the mobile station to send data without having to request permission in advance, which considerably shortens the delay and will therefore enhance the user enjoyment if being involved in an on-line game.

The delay problem was solved through proactively scheduling a mobile station without actual knowledge of the data it wants to transfer. This was in one embodiment done through employing an internal priority queue in order to make the base station presume that there is low priority traffic data needed to be transmitted in the uplink. A control loop provided by the uplink scheme determining unit then monitors the behaviour of the mobile station statistically to control the amount of data and the periodicity of the data that is assumed to arrive from the mobile station.

The effect of implementing a special priority queue is that the mobile station will get extra opportunities to be scheduled when possible without having any impact on performance for other queues. This means that:

In a low load situation, when there are free resources in time and frequency, the special priority queue will trigger the transmission control unit to issue periodic grants to the mobile station.

In a higher load situation, the special priority queue will not be scheduled since data from normal priority queues of other mobile stations will be prioritized.

The invention has a number of further advantages. It will improve the latency situation in a low load scenario in which the radio resources are not fully used. An example of a low load cell can be a pico cell. In such a scenario, parts of the radio resources are likely unused. In this case, it may be a good approach for a base station to give the unused resource to any mobile station which may or may not have data to transmit. If the number of mobile stations is small, there are many unused resources and resources could be granted to a mobile station continuously.

There are many ways in which the invention may be varied. In the example given above the uplink traffic control device was provided in the first base station. It should be realized that it may be provided in another network node instead, which communicates with the first base station.

Furthermore, a lot of the above described functionality may be omitted. It is for instance possible that the battery consumption is not estimated or that higher priority traffic is not considered. It is also possible to omit the considering of historical or statistical data as well as the use of the buffer with artificial data.

The uplink scheme determining module of the uplink traffic control device may be provided as a dedicated circuit such as a digital signal processor (DSP) or an Application Specific Integrated Circuit (ASIC). As an alternative it may be provided in the form of a processor with associated program memory including computer program code for performing the functionality of its units.

Figure 7:
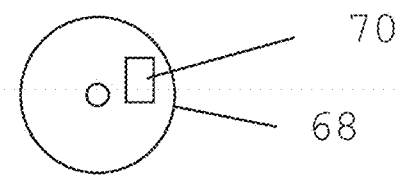

This computer program may also be a computer program product, for instance in the form of a computer readable storage medium or data carrier, like a CD ROM disc or a memory stick, carrying such a computer program with the computer program code, which will implement the function of the above-described module when being loaded into a an uplink traffic control device. One such computer program product in the form of a CD ROM disc 68 with the above-mentioned computer program code 70 is schematically shown in FIG. 7.

While the invention has been described in connection with what is presently considered to be most practical and preferred embodiments, it is to be understood that the invention is not to be limited to the disclosed 20 embodiments, but on the contrary, is intended to cover various modifications and equivalent arrangements. Therefore the invention is only to be limited by the following claims.

The invention claimed is:

1. A method for scheduling uplink traffic from a mobile station to a base station in a wireless communication network, the method being performed in a node of the wireless communication network and comprising:
    obtaining a service type indicator associated with a communication session of the mobile station, said indicator indicating that the communication session has a low priority;
    obtaining traffic load data concerning the traffic load in the wireless communication network;
    determining an uplink transmission scheme for the communication session based on the obtained service type indicator, wherein the uplink transmission scheme specifies the periodicity of the uplink transmission as well as the data size of the transmissions;
    determining that the uplink transmission scheme is to be applied, in response to determining that the traffic load is below a traffic load threshold; and,
    in response to determining that the uplink transmission scheme is to be applied, periodically granting transmissions to be made from the mobile station according to the uplink transmission scheme in order to speed up mobile station transmissions to the wireless communication network;
    wherein the uplink transmissions scheme is determined before mobile station transmissions are granted.

2. The method of claim 1, further comprising receiving data from the mobile station, where at least some of said received data is received as a response to the periodic transmission grants made according to the uplink transmission scheme.

3. The method of claim 2, further comprising updating the scheme based on received data.

4. The method of claim 1, further comprising estimating the data transmission requirements of the mobile station, and wherein the determining of the scheme is also based on the estimated data transmission requirements.

5. The method of claim 1, further comprising estimating the battery consumption of the mobile station, and wherein the determining of the scheme is also based on the estimated battery consumption.

6. The method of claim 1, wherein the determining of an uplink transmission scheme is based on statistical data about the mobile station.

7. An uplink traffic control device for scheduling uplink traffic from a mobile station to a base station in a wireless communication network, the uplink traffic control device comprising:
    an uplink scheme determining unit configured to obtain a service type indicator associated with a communication session of the mobile station, said indicator indicating that the communication session has a low priority, and to determine an uplink transmission scheme for the communication session based on the obtained service type indicator, wherein the uplink transmission scheme specifies the periodicity of the uplink transmission as well as the data size of the transmissions;
    a scheme application control unit configured to obtain traffic load data concerning the traffic load in the wireless communication system and to determine that the uplink transmission scheme is to be applied in response to determining that the traffic load is below a traffic load threshold; and
    a transmission control unit configured to, in response to the scheme application control unit determining that the uplink transmission scheme is to be applied, periodically grant transmissions to be made from the mobile station according to the uplink transmission scheme in order to speed up mobile station transmissions to the wireless communication network, wherein the uplink transmissions scheme is determined before mobile station transmissions are granted.

8. The uplink traffic control device of claim 7, wherein the device is configured to receive data from the mobile station, where at least some of said received data is received as a response to the periodic transmission grants made according to the uplink transmission scheme.

9. The uplink traffic control device of claim 8, wherein the uplink scheme determining unit is further configured to update the scheme based on received data.

10. The uplink traffic control device of claim 7, further comprising a transmission requirement estimating unit configured to estimate the data transmission requirements of the mobile station, and wherein the uplink scheme determining unit is further configured to determine the scheme also based on the estimated data transmission requirements.

11. The uplink traffic control device of claim 7, further comprising an energy consumption estimating unit configured to estimate the battery consumption of the mobile station, and wherein the uplink scheme determining unit is further configured to determine the scheme also based on the estimated battery consumption.

12. The uplink traffic control device of claim 7, wherein the uplink scheme determining unit is configured to base the determining of an uplink transmission scheme also on statistical data about the mobile station.

13. The uplink traffic control device of claim 7, further comprising an input buffer, which the transmission control unit is configured to read, wherein the uplink scheme determining unit is configured to place artificial data in the buffer with a rate that causes the transmission control unit to grant mobile station transmissions according to the uplink transmission scheme.

14. A non-transitory computer-readable medium comprising, stored thereupon, computer program code for scheduling uplink traffic from a mobile station to a base station in a wireless communication network, wherein the computer program code is configured to cause an uplink scheme determining module of an uplink traffic control device to:

obtain a service type indicator associated with a communication session of the mobile station, said indicator indicating that the communication session has a low priority;

obtain traffic load data concerning the traffic load in the wireless communication network;

determine an uplink transmission scheme for the communication session based on the obtained service type indicator, wherein the uplink transmission scheme specifies the periodicity of the uplink transmission as well as the data size of the transmissions;

determine that the uplink transmission scheme is to be applied in response to determining that the traffic load is below a traffic load threshold; and, in response to determining that the uplink transmission scheme is to be applied, periodically grant transmissions to be made from the mobile station according to the uplink transmission scheme in order to speed up mobile station transmissions to the wireless communication network, wherein the uplink transmissions scheme is determined before mobile station transmissions are granted.

* * * * *